United States Patent
Proctor et al.

(10) Patent No.: US 7,424,294 B2
(45) Date of Patent: Sep. 9, 2008

(54) METHOD AND SYSTEM FOR SWITCHING A MOBILE DEVICE IN A MOBILE NETWORK

(75) Inventors: Lee M. Proctor, Cary, IL (US); Stephen D. Magee, Scottsdale, AZ (US); William K. Morgan, Wauconda, IL (US); Robert S. Nikides, Carol Stream, IL (US)

(73) Assignee: Motorola, Inc., Schaumburg, IL (US)

(*) Notice: Subject to any disclaimer, the term of this patent is extended or adjusted under 35 U.S.C. 154(b) by 267 days.

(21) Appl. No.: 11/216,999

(22) Filed: Aug. 31, 2005

(65) Prior Publication Data

US 2007/0049273 A1    Mar. 1, 2007

(51) Int. Cl.
*H04Q 7/20*    (2006.01)
(52) U.S. Cl. .................. 455/436; 455/438; 455/439; 370/331; 370/332
(58) Field of Classification Search ......... 455/436–444, 455/524, 525, 561, 450, 452.2, 453, 455, 455/464, 509, 515–517, 560; 370/328, 331, 370/332
See application file for complete search history.

(56) References Cited

U.S. PATENT DOCUMENTS

| | | | | |
|---|---|---|---|---|
| 6,075,990 A | * | 6/2000 | Shin | 455/440 |
| 2005/0169207 A1 | * | 8/2005 | Muniere | 370/328 |
| 2005/0272403 A1 | * | 12/2005 | Ryu et al. | 455/403 |
| 2006/0073828 A1 | * | 4/2006 | Sipila | 455/436 |

* cited by examiner

*Primary Examiner*—Duc Nguyen
*Assistant Examiner*—Anthony S Addy

(57) ABSTRACT

A method and a system for switching a mobile device (102) from a source Base Transceiver Station (BTS) to a target BTS in a mobile network (100) are disclosed. The method includes detecting an intention to switch the cell transmitted by the mobile device. A Base Station Controller (BSC) (112) then receives the switch detect time from the source BTS and/or the target BTS. The switch detect time is processed by the BSC to determine the switch time for the mobile device. The mobile device then switches from communication with the source BTS to communication with the target BTS, based on the switch time.

21 Claims, 4 Drawing Sheets

800
METHOD AND SYSTEM FOR SWITCHING A MOBILE DEVICE IN A MOBILE NETWORK

FIELD OF THE PRESENT INVENTION

The present invention relates in general to the field of mobile communication. More specifically, the present invention relates to switching a mobile device from one cell to another in a mobile network.

BACKGROUND OF THE PRESENT INVENTION

Various methods have been developed to enable continuous connectivity of mobile devices in a mobile network. One of the methods is Code Division Multiple Access 2000 (CDMA2000). Mobile devices operating on this technology transmit and receive data by using spread spectrum techniques, and eliminate interference by the use of different codes.

The present state of the art involves technology implemented by the 3$^{rd}$ Generation Partnership Project 2 (3GPP2). This incorporates both voice and data transfer, using 1x Evolution—Data Optimized (1xEV—DO) and 1x Evolution—Data and Voice (1xEV—DV) specifications, enabling high-speed data transfer between a mobile device and a Base Transceiver Station (BTS) in a cell.

However, one or more of the technologies mentioned above restrict themselves to switching the mobile device from a source BTS to a target BTS, based on a walsh cover and timing information provided by one of the source BTS or the target BTS. This is undesirable in the event of loss or corruption of the information, for example, in the case of a quick-fade. A quick-fade occurs when a mobile device rapidly moves out of range from the source BTS. This results in errors in the detection of source BTS or target BTS. Moreover, there is no provision for the synchronization of the switching time that the two BTSs will require, resulting in the loss of some of the data transmitted during the switch.

BRIEF DESCRIPTION OF THE DRAWINGS

The present invention is illustrated by way of example and not limitation in the accompanying figures, in which like references indicate similar elements, and in which.

DETAILED DESCRIPTION OF THE PREFERRED EMBODIMENTS

Figure 1:
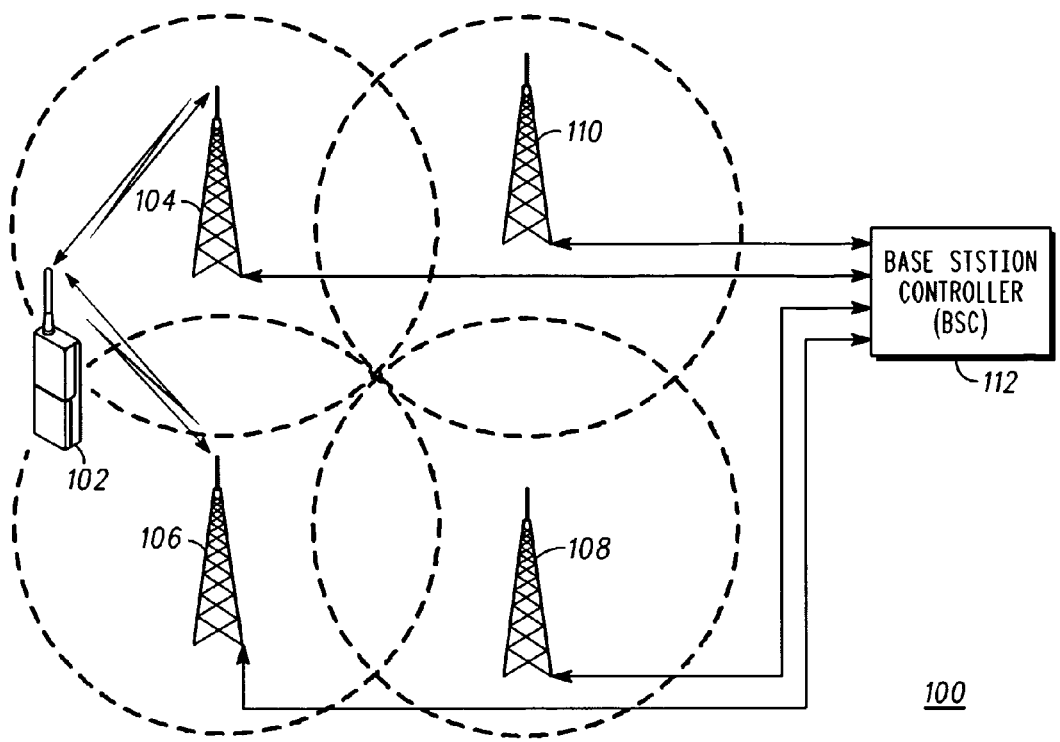
FIG. 1 depicts an environment in which the various embodiments of the present invention may operate.

Before describing in detail the particular method and system for switching a mobile device in a mobile network, in accordance with the present invention, it should be observed that the present invention resides primarily in combinations of method steps and apparatus components related to the method and system, for switching a mobile device in a mobile network. Accordingly, the apparatus components and method steps have been represented where appropriate by conventional symbols in the drawings. These show only the specific details that are pertinent for an understanding of the present invention, so as not to obscure the disclosure with details that will be readily apparent to those of ordinary skill in the art, with the benefit of the description herein In this document, the terms "comprises," "comprising," or any other variation thereof, are intended to cover a non-exclusive inclusion, so that a process, method, article or apparatus that comprises a list of elements does not include only those elements but may include other elements that are not expressly listed or inherent to such a process, method, article or apparatus. An element preceded by "comprises . . . a" does not, without more constraints, preclude the existence of additional identical elements in the process, method, article, or apparatus that comprises the element.

The term "another", as used herein, is defined as at least a second element or more. The terms "including" and/or "having", as used herein, are defined as comprising.

The present invention provides a method for switching a mobile device from a first cell in a mobile network to a second cell. A source Base Transceiver Station (BTS) transmits data to mobile devices in the first cell. Data is transmitted in the form of Payload Data Units (PDUs). The source BTS transmits PDUs to the mobile device by means of a communication channel. When a pilot signal strength of the communication channel falls below a pilot signal strength of at least one of a plurality of target BTS's pilot signal strength by a predefined threshold, the mobile device transmits an intention to switch the cell. The pilot signal strength is the ratio of the signal energy and the interference of the communication channel used by the source BTS for communication with the mobile device. The intention to switch the cell is detected by the source BTS and at least one target BTS. The target BTS is the BTS that may transmit data to the mobile device after the cell switch. On receiving the intention to switch the cell, at least one of the source BTS and the target BTS determines and transmits a switch detect time. The switch detect time is determined, based on the Coordinated Universal Time (UTC) for the mobile network. A switch time is determined based on the switch detect time. The switching of the cell is scheduled to occur after the switch time. After the switch, the source BTS stops transmitting PDUs and the target BTS starts transmitting them. The mobile device starts communicating with the target BTS, using a second communication channel.

The present invention describes a system that is capable of switching the mobile device from the source BTS to the target BTS in a mobile network. The mobile network includes a plurality of mobile devices. The system includes a plurality of BTSs and at least one base Station Controller (BSC). The BSC is configured to receive the switch detect time and processes it determine a switch time.

FIG. 1 depicts an environment in which the various embodiments of the present invention may operate. The environment depicts a mobile network 100. The mobile network 100 includes a mobile device 102, a BTS 104, a BTS 106, a BTS 108, a BTS 110, and a BSC 112. It should be appreciated that there may be a plurality of mobile devices and a plurality of BTSs in the mobile network 100, in accordance with various embodiments of the present invention. The mobile network 100 allows communication between the mobile device 102 and the BTSs 104, 106, 108 and 110 by using a plurality of communication channels. In an embodiment of the present invention, the communication channel utilizes a Forward-Packet Data Channel (F-PDCH) for transmission of data from a source BTS, for example, the BTSs 104, to the mobile device 102 and a Reverse Channel Quality Indicator Channel (R-CQICH), for transmission of data from the mobile device 102 to a source BTS, for example, the BTS 104. The F-PDCH and the R-CQICH channels are supported by the 1x Evolution—Data and Voice (1xEV—DV) specifications of the $3^{rd}$ Generation Partnership Project 2 (3GPP2) standards. The communication channel being used by a BTS is identified through a walsh cover. The walsh cover includes information about the BTS 104 and a sector of the BTS 104 that is transmitting data to the mobile device 102.

In another embodiment, The F-PDCH and the R-CQICH channels are presented in the Forward Traffic Channel, Data Source Control Channel and Data Rate Control Channel (DRC) of the 1x Evolution—Data (1xEV—DO) specifications of the 3GPP2 standards. The communication channel being used by a BTS in this embodiment, may be identified through a Data Source Channel (DSC). The DSC includes information about the BTS 104 and the DRC indicates sector of the BTS 104 that is transmitting data to the mobile device 102.

The BSC 112 regulates communication between the BTS 104 and the mobile device 102. The BSC 112 sends PDUs that are addressed to the mobile device 102. Examples of PDUs may include real-time PDUs and non-real-time PDUs.

Figure 2:
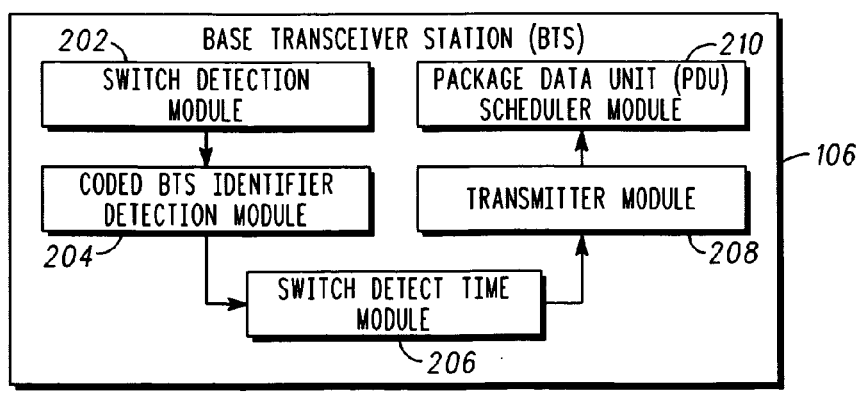
FIG. 2 is a block diagram depicting the components of a Base Transceiver Station (BTS), in accordance with an embodiment of the present invention.

FIG. 2 is a block diagram depicting the components of the Base Transceiver Station (BTS) 104, in accordance with an embodiment of the present invention. The BTS 104 is capable of communicating with the mobile device 102 and the BSC 112 in the mobile network 100. The BTS 104 receives an intention to switch the cell from the mobile device 102. The mobile device 102 transmits the intention to switch the cell when a pilot signal strength of the communication channel of the BTS 104 falls below the pilot signal strength of at least one target BTS by a predefined threshold. A switch detection module 202 detects the intention to switch the cell for the mobile device 102. The intention to switch the cell is received by the source BTS and the target BTSs. For example, the mobile device 102 is switching from a first cell corresponding to the BTS 104 to a second cell corresponding to the BTS 106. The BTS 104 has hereinafter also been referred to as a source BTS 104, and the BTS 106 has hereinafter also been referred to as a target BTS 106. The intention to switch the cell received by the source BTS 104 includes a coded BTS identifier, which may include either a walsh cover of a R-CQICH or a codeword in a DSC of the target BTS 106, indicating the intention to switch from the source BTS 104 to the target BTS 106. Prior to this time, the source BTS 104 received a coded BTS identifier of the source BTS 104. Similarly, the intention to switch the cell received by the target BTS 106 includes a coded BTS identifier, which may include either a walsh cover on a R-CQICH or a code word in a DSC of the target BTS 106. Prior to this time, the target BTS 106 received a coded BTS identifier of the source BTS 104. The intention to switch is indicated by the change from a source coded BTS identifier to a target coded BTS identifier.

In an embodiment of the present invention, there may be more than one target BTS for the mobile device 102. This may happen in cases where the mobile device 102 has more than one probable cell to which it can switch over.

A coded BTS identifier detection module 204, present in the BTS 104, detects the coded BTS identifier in the intention received by the switch detection module 202. Coded BTS identifier may be either a walsh cover or a codeword in a DSC cell cover, and the like. The coded BTS identifier detection module 204 keeps track of the coded BTS identifiers of the communication channels for the BTS 104. In an embodiment of the present invention, the coded BTS identifier detection module 204 sends the coded BTS identifier received in the intention to switch the cell to the BSC 112. The source BTS 104 sends a coded BTS identifier of the target BTS 106 to the BSC 112; similarly the target BTS 106 sends a coded BTS identifier of the source BTS 104 to the BSC 112. Switch detection module 202 detects the change from source coded BTS identifier to target coded BTS identifier and sends this indication to coded BTS identifier detection module 204.

A switch detect time module 206 present in the BTS 104 determines the switch detect time for the mobile device 102. The determination of the switch detect time is based on a UTC stamp included in the intention to switch the cell. The switch detect time indicates the time the source BTS 104 will take to carry out the switching of the mobile device 102. The switch detect time depends on the quality of the communication channel between the source BTS 104 and the mobile device 102. The switch detect time is transmitted to the BSC 112 by a transmitter module 208. The transmitter module 208 is also capable of transmitting data from the source BTS 104, in the form of PDUs. The transmitter module 208 is also capable of transmitting information pertaining to at least one non-transmitted PDU from the source BTS 104. A PDU scheduler module 210 in the BTS 104 provides this information, and schedules transmission of real time PDUs and non-real time PDUs from the source BTS 104, in accordance with an embodiment of the invention.

Figure 3:
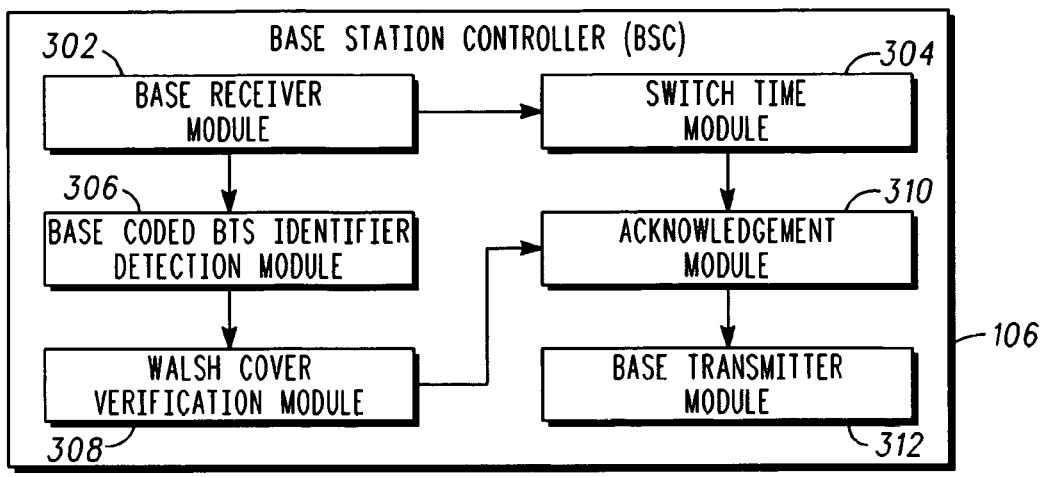
FIG. 3 is a block diagram depicting the components of a Base Station Controller (BSC), in accordance with an embodiment of the present invention.

FIG. 3 is a block diagram depicting the components of the BSC 112, in accordance with an embodiment of the present invention. The BSC 112 is capable of communicating with the plurality of BTSs in the mobile network 100. The BSC 112 includes a base receiver module 302 for receiving data transmitted by the plurality of BTSs in the mobile network 100. A switch time module 304 is capable of processing a source switch detect time and a target switch detect time, received from the source BTS 104 and at least one target BTS, respectively. The switch time module 304 then determines a switch time for the mobile device 102, which indicates the time required for switching the mobile device 102 from the source BTS 104 to the target BTS 106. The switching is based on the determination of the value of the switch time that is suitable for coordinating the switching of the cell between the source BTS 104 and the target BTS 106.

A base coded BTS identifier detection module 306 is capable of detecting the source coded BTS identifier and the target coded BTS identifier received from the target BTS 106 and the source BTS 104, respectively. In an embodiment of the present invention, a coded BTS identifier verification module 308 verifies the source coded BTS identifier and the target coded BTS identifier to implement cell selection detection integrity. This involves elimination of errors during the transmission of the source walsh cover and the target coded BTS identifier. Cell selection detection integrity, therefore, ensures that the switch from a source BTS to a target BTS is error free.

On determining the switch time and detecting the source coded BTS identifier, an acknowledgement module 310 sends a switch transmission message to the source BTS 104 and the target BTS 106. The switch transmission message includes the switch time. The acknowledgement module 310 further transmits an acknowledgement message on receiving switch detect time from the plurality of BTSs. In an embodiment of the present invention, the acknowledgement message is transmitted by a base transmitter module 312, which also transmits PDUs to the plurality of BTSs.

Figure 4:
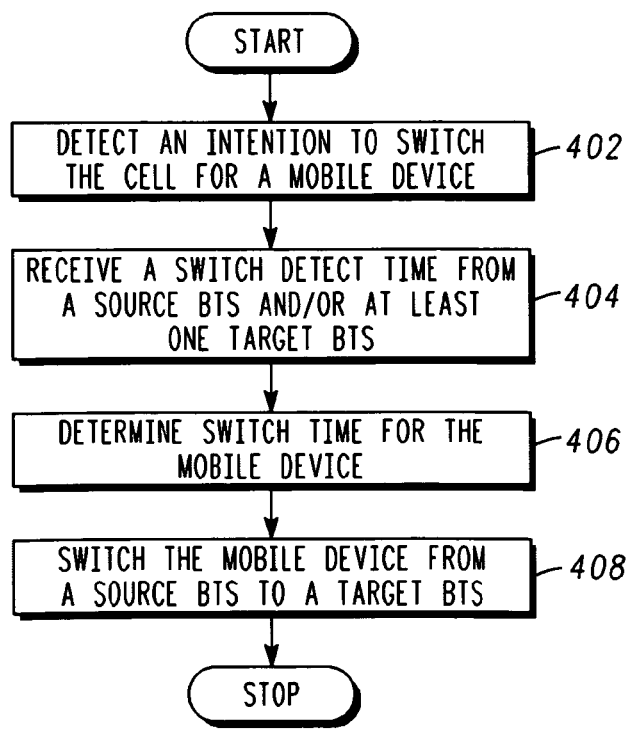
FIG. 4 is a flowchart illustrating a method for switching a mobile device from a source BTS to a target BTS in a mobile network, in accordance with an embodiment of the present invention.

FIG. 4 is a flowchart illustrating a method for switching the mobile device 102 from the source BTS 104 to the target BTS 106 in the mobile network 100, in accordance with an embodiment of the present invention. At step 402, an intention to switch the cell for the mobile device 102 is detected by the source BTS 104 and at least one target BTS, for example the BTS 106. The intention to switch the cell is a message transmitted by the mobile device 102, indicating an intention to switch from the source BTS 104 to the target BTS 106. The intention to switch the cell is transmitted whenever the pilot signal strength of the communication channel of the source BTS 104 falls below at least one of the target BTS's pilot signal strength by a predefined threshold. At step 404, a switch detect time is received from the source BTS 104 and/or at least one target BTS, such as the BTS 106. At step 406, a switch time is determined for the mobile device 102. The switch time is determined by the BSC 112, based on the switch detect times. The BSC 112 sends the switch time to the source BTS 104 and at least one target BTS, to coordinate the switching of the cell. At step 408, the mobile device 102 is switched from the source BTS 104 to the target BTS 106. This involves stopping transmission of PDUs from the source BTS 104 and beginning their transmission from the target BTS 106.

Figure 5:
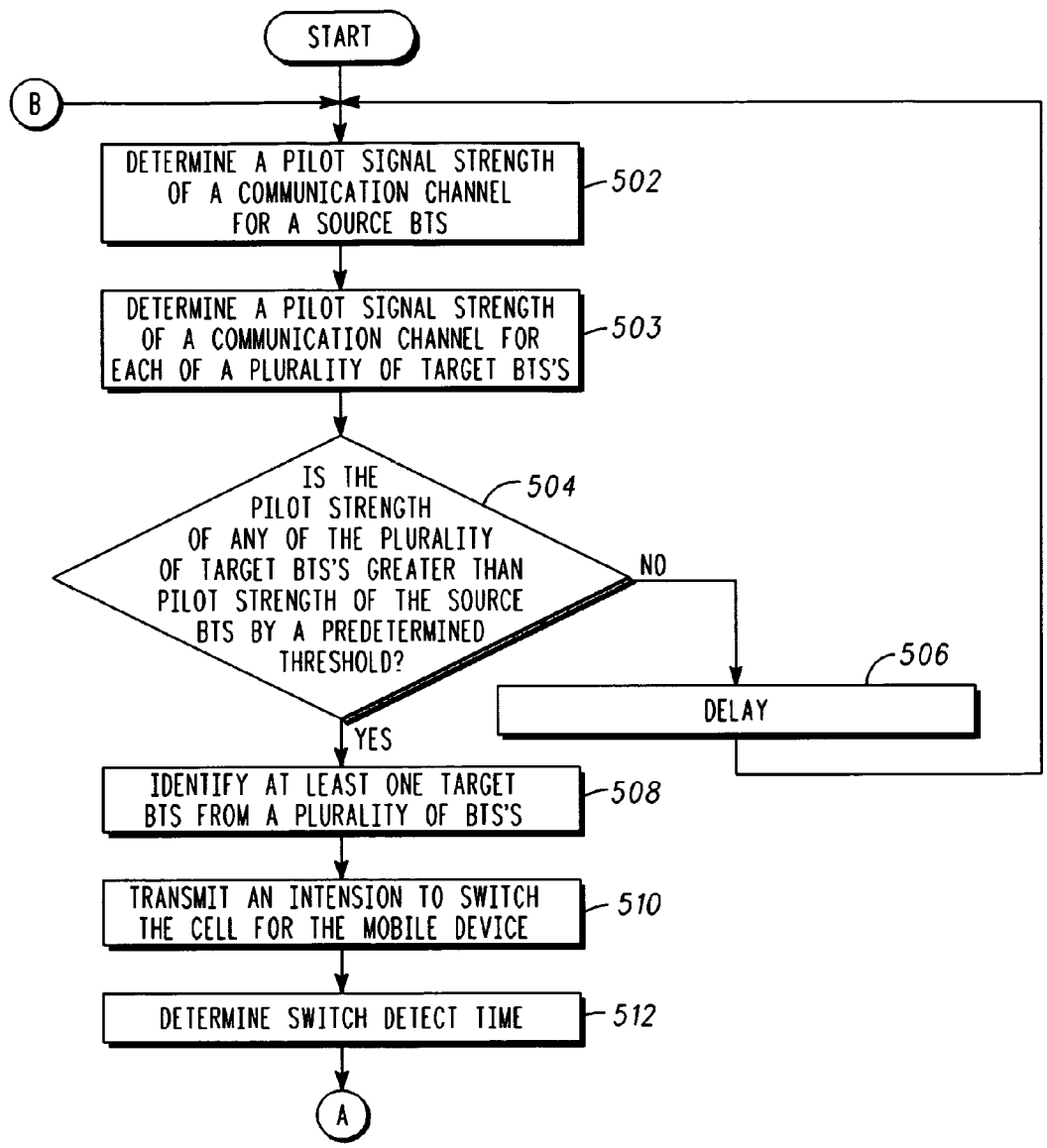
FIGS. 5, and 6 illustrate a detailed method for switching a mobile device from a source BTS to a target BTS in a mobile network, in accordance with another embodiment of the present invention.
Figure 6:
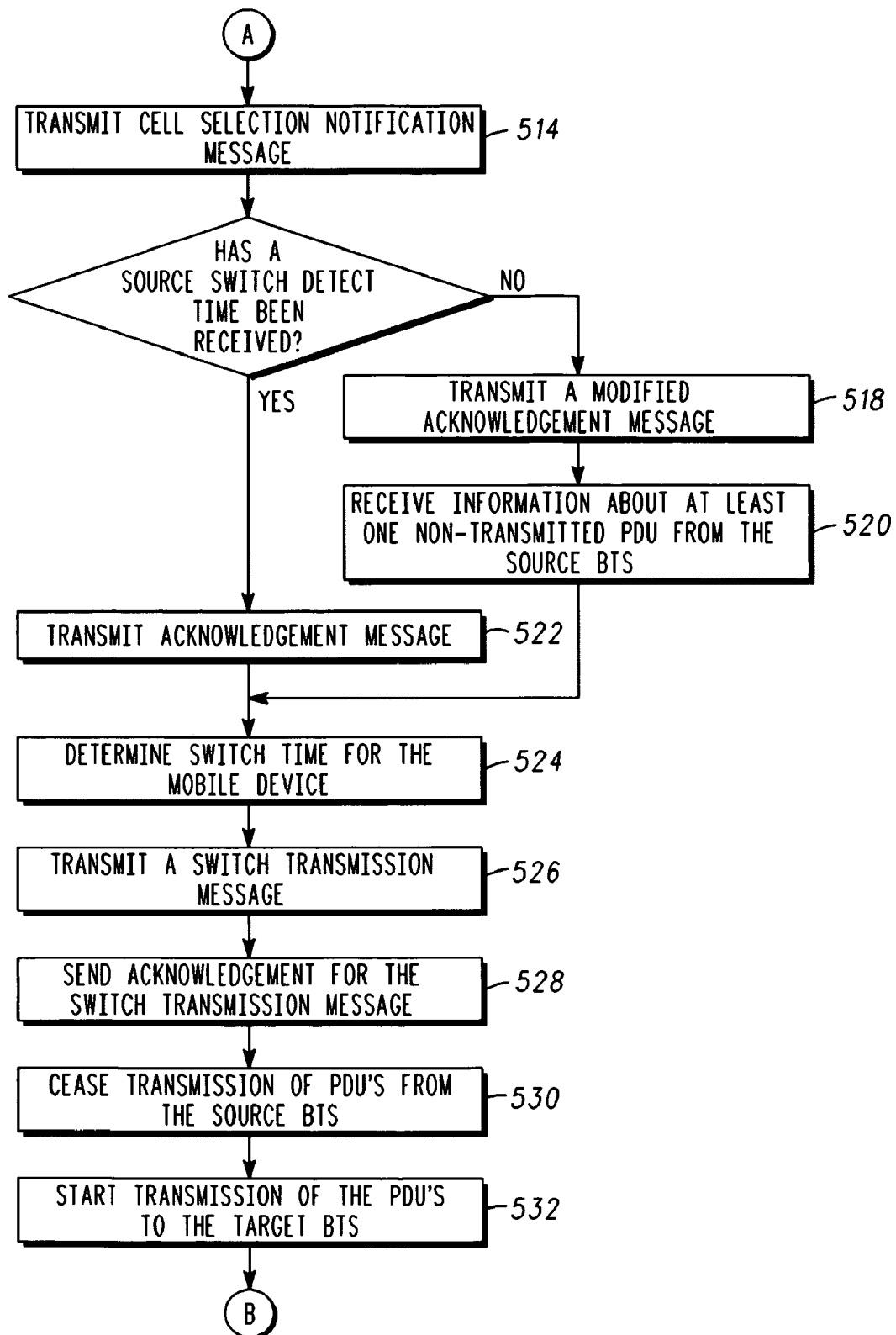

FIGS. 5 and 6 illustrate a detailed method for switching the mobile device 102 from the source BTS 104 to the target BTS 106 in the mobile network 100, in accordance with another embodiment of the present invention. At step 502, the mobile device 102 determines a pilot signal strength of a communication channel being used by the source BTS 104. At step 503, the mobile device 102 determines a pilot signal strength of a plurality of target BTSs. At step 504, the pilot signal strength is compared with a plurality of target BTSs pilot signal strengths. If the source pilot signal strength is more than or equal to all of the plurality of target BTS's pilot signal strength, step 502 is performed again after a delay at step 506. Therefore, the mobile device 102 periodically checks the pilot signal strength of the communication channel.

However, if the pilot signal strength of the source BTS is less than at least one of the plurality of BTS's pilot signal strength by a predefined threshold (for example and without limitation, a signal strength amount, and the like), step 508 is performed. At step 508, at least one target BTS is identified from the plurality of BTSs. This identification is carried out amongst the active set of BTSs, which can communicate with the mobile device 102. At step 510, the mobile device 102 transmits an intention to switch the cell. This is transmitted to the source BTS 104 and the at least one target BTS. In an embodiment of the present invention, the mobile device 102 transmits the intention to switch the cell by changing the coded BTS identifier of the communication channel to a target coded BTS identifier of the at least one target BTS, for example, the BTS 106. On the detection of the intention to switch the cell at step 512, the source BTS 104 and the target BTS 106 each determine their switch detect time using the received intention to switch the cell. This involves processing the UTC stamp of the intention to switch the cell. When the switch detect time is determined, the source BTS 104 and the target BTS 106 transmit a cell selection notification message to the BSC 112 at step 514. The cell selection notification message includes the switch detect time. A cell selection notification message sent by the source BTS 104 includes the target coded BTS identifier of the target BTS 106 and the source switch detect time. Similarly, a cell selection notification message sent by the target BTS 106 includes the source coded BTS identifier of the source BTS 104 and the target switch detect time.

At step 516, the BSC 112 checks if the source switch detect time has been received. If the source switch detect time has not been received at step 518, a modified acknowledgement message is transmitted to the source BTS 104. The modified acknowledgement message includes a buffer-status required bit that includes a request for information about at least one non-transmitted PDU. The information is then transmitted by the source BTS 104. At step 520, the BSC 112 receives the information from the source BTS 104.

However, if the source switch detect time has been received by the BSC 112, step 522 is performed. At step 522, the BSC 112 transmits an acknowledgement message to the source BTS 104 and the target BTS 106. In either case, after step 520 or step 522, step 524 is performed. At step 524, the switch time of the mobile device 102 is determined. At step 526, the BSC 112 transmits a switch transmission message, which includes the switch time of the mobile device 102.

When the switch transmission message is received by the source BTS 104 and the target BTS 106 at step 528, each sends an acknowledgement to the BSC 112 for the switch transmission message. Further, at step 530, the source BTS 104 ceases the transmission of PDUs to the mobile device 102. The switch of the cell is carried out, based on the switch time. This involves beginning transmission of the PDUs from the target BTS 106 to the mobile device 102 at step 532. The detailed method then performs the step 502 again. This makes the detailed method periodic.

In another embodiment of the present invention, while switching the cell, the source BTS 104 ceases transmission of non-real-time PDUs but continues transmission of real-time PDUs to the mobile device 102. At the end of the switch time, the target BTS 106 begins transmission of PDUs with the transmission of at least one non-transmitted PDU. At least one non-transmitted PDU is a non-real time PDU.

In yet another embodiment of the present invention, the method for switching the mobile device can be used in a 1x Evolution—Data Optimized (1xEV—DO) system. This involves indicating an intention to switch the cell by changing the Data Rate Control (DRC) channel in conjunction with changing of the cell cover on the DSC channel.

Various embodiments of the present invention have the following advantages. First, by receiving both the source coded BTS identifier and the target coded BTS identifier, the method achieves cell selection detection integrity. This enables recovery in the event of error scenarios arising due to a quick fade. Second, the system receives the switch detect time from the source BTS and the target BTS, enabling coordination of the switch time and ensuring continuity in data and voice transmission. This minimizes the occurrence of audio holes during transmission. Third, the present invention provides integrity while switching the cell for 1xEV—DV and 1xEV—DO implementation under 3GPP2 standards.

This disclosure is intended to elaborate on how to fashion and use various embodiments, in accordance with the present invention, rather than limit the true, intended, fair scope and spirit thereof. The foregoing description is not intended to be exhaustive or limit the present invention to the precise forms disclosed. Modifications or variations are possible in light of the above teachings. The embodiment was chosen and described, to provide the best illustration of the principles of the present invention and its practical application, to enable one with ordinary skill in the art to utilize the present invention in various embodiments and with various modifications, as are suited to the particular use contemplated. All such modifications and variations are within the scope of the present invention, as determined by the appended claims, which may be amended during the pendency of this application for patent, and all equivalents thereof, when interpreted in accordance with the breadth to which they are fairly, legally and equitably entitled.

In the foregoing specification, the present invention and its benefits and advantages have been described with reference to specific embodiments. However, one of ordinary skill in the art would appreciate that various modifications and changes can be made, without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The present invention is defined solely by the appended claims, including any amendments made during the pendency of this application and all equivalents of the claims, as issued.

What is claimed is:

1. A method for switching a mobile device from a source Base Transceiver Station (BTS) to a target BTS in a mobile network, the mobile network enabling communication between a plurality of mobile devices, the method comprising:
    detecting a cell switch intention received from the mobile device, wherein the cell switch intention is detected by the source BTS and at least one target BTS;
    receiving a switch detect from the source BTS and the at least one target BTS;
    receiving at least one of a source coded BTS identifier from the at least one target BTS and at least one target coded BTS identifier from the source BTS;
    determining a switch time for the mobile device based on the switch detect time; and
    switching the mobile device from the source BTS to the target BTS based on the switch time.

2. The method according to claim 1, wherein detecting the cell switch intention comprises periodically comparing an average channel power with an average channel power of one or more of a plurality of target BTSs.

3. The method according to claim 1 further comprising sending an acknowledgment message to the source BTS and the at least one target BTS on receiving the switch detect time from the source BTS and the at least one target BTS.

4. The method according to claim 1 further comprising transmitting a modified acknowledgement message when a switch detect time is received from one of: the source BTS and the at least one target BTS.

5. The method according to claim 1 further comprising receiving information pertaining to at least one non-transmitted payload data unit (PDU) from the source BTS.

6. The method according to claim 5, wherein the non-transmitted PDU is a PDU in queue to be transmitted using a Forward-Packet Data Channel of the mobile network.

7. The method according to claim 1 further comprising transmitting a switch transmission message to the source BTS and the target BTS, the switch transmission message comprising the switch time.

8. The method according to claim 1, wherein switching the mobile device comprises:
    discontinuing transmission of PDUs from the source BTS; and
    beginning transmission of the PDUs from the target BTS.

9. The method according to claim 8, wherein beginning transmission of the PDUs from the target BTS comprises transmitting a first non-scheduled PDU from the target BTS.

10. The method according to claim 8, wherein switching the mobile device comprises transmitting real time PDUs continuously during the switch time.

11. The method according to claim 10, wherein discontinuing transmission of the PDUs comprises discontinuing transmission of non-real time PDUs, and wherein beginning transmission of the PDUs comprises beginning transmission of non-real time PDUs.

12. The method according to claim 1, wherein switching the mobile device comprises handing over transmission of PDUs from the source BTS to the target BTS at the end of the switch time.

13. The method of claim 1, wherein the source coded BTS identifier is at least one of a source walsh cover of a Reverse Channel Quality Indicator Channel (R-CQICH) and a source cell cover on a DSC channel.

14. The method of claim 1, wherein the target coded BTS identifier is at least one of a target walsh cover of a Reverse Channel Quality Indicator Channel (R-CQICH) and a target cell cover on a DSC channel.

15. A method for switching a mobile device from a source Base Transceiver Station (BTS) to a target BTS in a mobile network, the mobile network enabling communication between a plurality of mobile devices, the method comprising:
    detecting a cell switch intention received from the mobile device, wherein the cell switch intention is detected by the source BTS and at least one target BTS;
    receiving a switch detect time from the source BTS and the at least one target BTS;
    receiving a source coded BTS identifier and at least one target coded BTS identifier from the at least one target BTS and the source BTS respectively;
    determining a switch time based on the switch detect time;
    transmitting a switch transmission message to the source BTS and the target BTS, the switch transmission message comprising the switch time; and
    switching the mobile device from the source BTS to the target BTS based on the switch time.

16. The method according to claim 15 further comprising sending an acknowledgment message to the source BTS and the at least one target BTS on receiving the switch detect time.

17. The method according to claim 15, wherein switching the mobile device comprises:
    discontinuing transmission of PDUs from the source BTS; and
    beginning the transmission of the PDUs from the target BTS.

18. The method according to claim 17, wherein beginning transmission of the PDUs from the target BTS comprises transmitting a first non-scheduled PDU from the target BTS.

19. The method according to claim 17, wherein switching the mobile device comprises transmitting real time PDUs continuously during the switch time.

20. The method according to claim 19, wherein discontinuing transmission of the PDUs comprises discontinuing transmission of non-real time PDUs, and wherein beginning transmission of the PDUs comprises beginning transmission of non-real time PDUs.

21. The method according to claim 15, wherein switching the mobile device comprises handing over transmission of PDUs from the source BTS to the target BTS at the end of the switch time.

* * * * *